United States Patent [19]

Meno

[11] Patent Number: 5,003,618

[45] Date of Patent: Mar. 26, 1991

[54] AUTOMATIC ADAPTIVE ANISOTROPIC DIGITAL FILTERING AND BIASING OF DIGITIZED IMAGES

[75] Inventor: Frank Meno, Pittsburgh, Pa.

[73] Assignee: University of Pittsburgh of the Commonwealth System of Higher Education, Pittsburgh, Pa.

[21] Appl. No.: 380,208

[22] Filed: Jul. 14, 1989

[51] Int. Cl.$^5$ ............................................. G06K 9/36
[52] U.S. Cl. ................................. 382/54; 364/724.12; 382/52
[58] Field of Search .................. 382/54, 52, 22, 27; 364/724.05, 724.12; 358/167

[56] References Cited

U.S. PATENT DOCUMENTS

| | | | |
|---|---|---|---|
| 4,541,116 | 9/1985 | Lougheed | 382/49 |
| 4,547,895 | 10/1985 | Mita et al. | 382/22 |
| 4,618,990 | 10/1986 | Sieb, Jr. et al. | 382/43 |
| 4,691,366 | 9/1987 | Fenster et al. | 382/54 |
| 4,724,544 | 2/1988 | Matsumoto | 382/27 |
| 4,760,541 | 7/1988 | Weygandt et al. | 364/724 |
| 4,783,840 | 11/1988 | Song | 382/54 |
| 4,791,679 | 12/1988 | Barski et al. | 382/55 |
| 4,792,900 | 12/1988 | Sones et al. | 364/413.23 |
| 4,811,414 | 3/1989 | Fishbine et al. | 382/54 |
| 4,908,872 | 3/1990 | Toriu et al. | 382/22 |

Primary Examiner—Leo H. Boudreau
Assistant Examiner—David Fox
Attorney, Agent, or Firm—Richard V. Westerhoff; Arnold B. Silverman

[57] ABSTRACT

Adaptive anisotropic digital filtering is automatically applied to the gray scale values of substantially of all the pixels in at least a portion of a digital image by, for each such pixel, selecting and angularly orienting the matrix of coefficients of an anisotropic filter kernel as a weighting function of the gray scale values of pixels in eight, 45 degree sectors under the kernel, and then performing a convolution of the gray scale values of pixels under the kernel with the rotated kernel to generate a filtered value for the center pixel. Local brightness of the image is adjusted either in conjunction with anisotropic filtering or separately by comparing for each pixel the average gray scale value of the pixels under the kernel with a reference value and applying a bias function to the center pixel grey scale value to brighten or darken the image dependent upon the results of the comparison.

21 Claims, 4 Drawing Sheets

```
0   -1   0   +1   0
0   -1   0   +1   0
0   -2  +1   2    0
0   -1   0   +1   0
0   -1   0   +1   0
```

```
0   0   +1   0   0
0   0   +1   0   0
+1  -3  +1  -3   +1
0   0   +1   0   0
0   0   +1   0   0
```

|  |  |  |  |  |
|---|---|---|---|---|
| -1 | -1 | -1 | -1 | -1 |
| -1 | -1 | -1 | -1 | -1 |
| 0 | 0 | 0 | 0 | 0 |
| +1 | +1 | +1 | +1 | +1 |
| +1 | +1 | +1 | +1 | +1 |

|  |  |  |  |  |
|---|---|---|---|---|
| +1 | 0 | 0 | 0 | +1 |
| 0 | +1 | 0 | -3 | 0 |
| 0 | 0 | +1 | 0 | 0 |
| 0 | -3 | 0 | +1 | 0 |
| +1 | 0 | 0 | 0 | +1 |

AUTOMATIC ADAPTIVE ANISOTROPIC DIGITAL FILTERING AND BIASING OF DIGITIZED IMAGES

BACKGROUND OF THE INVENTION

1. Field of the Invention

This invention relates to filtering the gray scale values for the pixels of a digitized image, and in particular to adjusting the gray scale values using anisotropic filter kernels separately oriented for each pixel dependent upon local conditions surrounding that pixel. The invention also encompasses biasing the pixel values as a function of the average gray scale value of pixels under the kernel to locally modify brightness without substantially affecting contrast.

2. Background Information

It is common practice to employ digital filters to enhance or to suppress particular features in digital image data, for instance, to suppress noise or to enhance line definition. Such filters employ a kernel comprising a matrix of coefficients which operates on the gray scale values of pixels surrounding the pixel value being modified.

Systems have been proposed to automatically select a filter function for the individual pixels in the digitized image dependent upon the gray scale values of pixels surrounding the pixel to which the filter function is being applied. One such system disclosed in U.S. Pat. No. 4,783,840 determines from the gray scale values of eight pixels surrounding a pixel value to be enhanced whether to apply a low pass filter function or a high pass filter function. Thus, the filter function applied depends upon the local conditions. Another system disclosed in U.S. Pat. No. 4,691,336 and directed to a technique for enhancing digital fluorograph images, utilizes a low pass filter to reduce noise and if an edge is identified by an edge identifier, a high pass filter is also applied to the pixel data. The low pass and high pass filters utilized in these patented systems are designed to solve some specific objectives, but lack universal applicability, both in type of filtering operation and size of the operating kernel area.

While the averaging function performed by low pass filters reduces noise, it tends to blur line definition when applied in a direction perpendicular to a line in an image. On the other hand, while high pass filters enhance line definition when applied across a line feature, they accentuate noise and tend to break up a line when applied parallel to the line. Hence, there are applications where isotropic filters can enhance an image in some aspects but degrade it in other respects.

Anisotropic filter kernels, which have different filtering characteristics in different axes, have been applied to digital data sets. However, the anisotropic property of such kernels, in general, requires local adaptation in order to produce the desired results. Until now, this has usually been done with human interaction because it has not been found feasible to automate the required decision making. This has made it unpracticable to adapt an anisotropic filter for each individual pixel in any reasonably sized digital display.

It has also been noted that in some digital images, there may be some areas in which it is desirable to brighten or darken a selected area or to brighten some areas and darken others. This may be done, for instance, to remove a shadow or non-uniform illumination, or to emphasize a particular feature of the image. It would be desirable if this could be performed on a pixel by pixel basis automatically and without affecting contrast.

There is a need therefore for a method and apparatus for applying an anisotropic filter to digital image gray scale values which automatically adapts for the conditions around each pixel of the image or at least the pixels in a significant portion of the image.

In particular, there is need for such a method and apparatus which automatically aligns an anisotropic filter based upon the gray scale values of pixels surrounding the pixel to which the filter is being applied.

There is a companion need for a method and apparatus for biasing gray scale values for pixels in a digital image to locally adjust brightness across the image.

There is a subordinate need for such a method and system for biasing gray scale values which does not substantially affect contrast.

SUMMARY OF THE INVENTION

These and other needs are satisfied by the invention in which anisotropic filtering is automatically applied to substantially all of the pixels in at least a portion of a digitized image with the matrix of coefficients of the kernel of the anisotropic filter angularly oriented as a function of the distribution of the gray scale values of pixels under the kernel. More particularly, the pixels under the kernel are grouped into sectors equiangularly spaced around a selected pixel to which the filtering is being applied. The sectors are defined by sector axes which pass adjacent to, and space equal numbers of pixels under the kernel from, the selected pixel. In the preferred embodiment of the invention, there are eight sectors spaced 45 degrees apart. The average gray scale gradient value between the pixels in each sector and those in the opposite sector. For instance, the highest, or the lowest, gradient value may be selected for the purpose of orienting the anisotropic kernel. In any event, the anisotropic kernel is then aligned relative to the axis of the selected sector, and a convolution of the rotated anisotropic kernel and the gray scale values of the pixels under the kernel is performed to generate a modified gray scale value for the selected pixel. The average gray scale values in the sectors may be utilized to select the anisotropic filter function to be applied, as well as angularly orienting it.

The invention also includes locally adjusting the brightness of the digitized image without substantially affecting contrast, for instance, to remove shadows in a portion of the image or to accentuate certain features. Biasing is applied by comparing the average gray scale value for all the pixels under the kernel, or in another predetermined pattern around a selected pixel, and applying a bias function to the gray scale value of the selected pixel in a sense determined by the comparison. For instance, where it is desired to remove shadows, the bias function can be applied in a sense to increase the gray scale values of pixels for which the average gray scale value under the kernel is less than the reference value. Conversely, differences in brightness can be accentuated by applying the bias function in a sense which increases the gray scale value where the average value under the kernel exceeds the reference value, and in a sense which reduces the gray scale value for those pixels at which the average value under the kernel is less than the reference value. In the latter case, the bias adjusted values should be checked against limits, and recalculated using a different bias function if a limit is exceeded to avoid saturation. The biasing may be applied with the filtering since the average gray scale values can be calculated during the filtering operation; however, biasing in accordance with the invention can be applied to digital image data independently of filtering.

The invention encompasses both a method and apparatus for anisotropic filtering and biasing of the gray scale values of digital image pixels.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to enhancing X-ray images, however, it will be appreciated by those skilled in the art that it has application to enhancing digital image data derived from other sources and used for other purposes.

Figures 1, 2, 3:
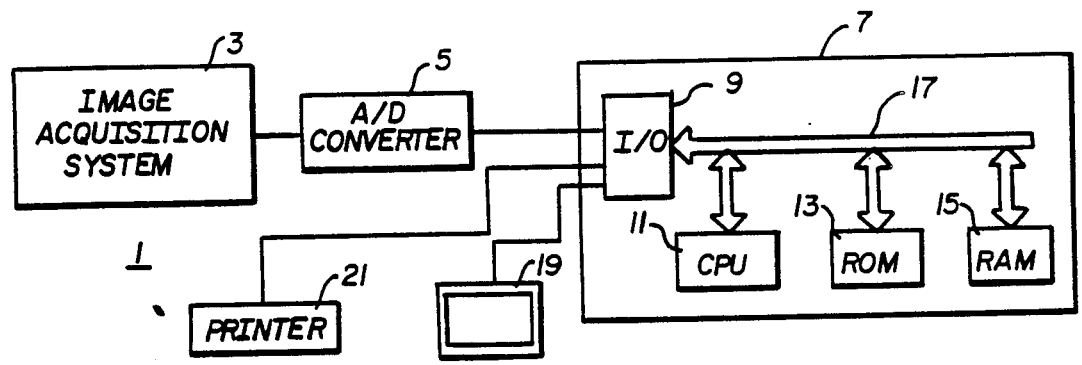
FIG. 1 is a schematic diagram of a system for carrying out the invention.
FIG. 2 is a diagram of an example of an anisotropic, averaging low pass and first order differencing high pass kernel suitable for use with the invention.
FIG. 3 is a diagram of an example of an anisotropic averaging low pass and second order differencing kernel suitable for alternative use with the invention.

Referring to FIG. 1, the system 1 includes a data acquisition system 3 which for X-ray systems would include an X-ray source, an image intensifier and a video camera. The analog signals generated by the video camera are converted to digital signals by an analog to digital converter 5 for input into a digital computer 7. The digital computer 7 includes an input/output device 9, a central processing unit 11, a read only memory (ROM) 13, and a random access memory (RAM) 15, all of which are connected by a bus 17. The ROM 13 stores the computer software, while the RAM 15 stores the program and the image pixel data generated by the image acquisition system 3, the anisotropic filter parameters, and other data. The raw and/or the enhanced image generated by the system can be viewed on a monitor 19 and can also be printed in hard copy on a printer 21.

One aspect of the invention involves applying an anisotropic filter kernel to the gray scale values of the image pixel data. The kernel is defined as a matrix of filter coefficients. The value of the coefficients and the size of the kernel depend upon the desired effect of the filter operation on the image, but for practical reasons, the kernel size is much smaller than the image size, and the coefficients must be restricted to certain relationships in order to yield meaningful transformation of images. In enhancing line definition in medical image processing, such as for example, to enhance the arteries in coronary angiograms, an anisotropic kernel which performs low pass filtering along the arteries and high pass filtering perpendicular to them will effectively enhance the image. An example of an anisotropic filter function performing averaging low pass filtering in the vertical direction and first order differencing high pass filtering in a horizontal direction is illustrated in FIG. 2. An example of an alternative anisotropic filter function performing averaging low pass filtering in a vertical direction and second order differencing high pass filtering in a horizontal direction is shown in FIG. 3. While 5×5 kernels are illustrated, the invention is not limited to any particular size kernel.

Figure 4:
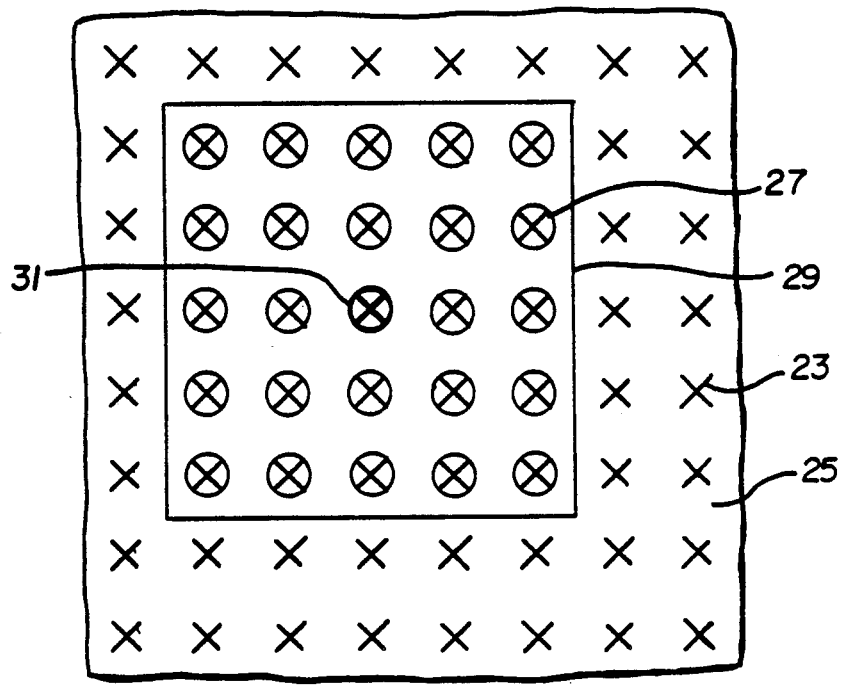
FIG. 4 is a diagram illustrating application of the filters of FIGS. 2 and 3 to image pixel data.

Filtering of the pixel data with the anisotropic kernel is performed by a convolution operation which is defined as:

$$R = CONV(P, X, Y, KERNEL) = \sum_{i=o}^{K} \sum_{j=o}^{L} P[X+i, Y+j] * Kernel[i,j]$$

Where P equals the gray scale value of the pixel, i equals the range of values of X under the kernel, and j equals the range of values of Y under the kernel, and the KERNEL equals the matrix of filter coefficients such as shown for example in FIGS. 2 and 3. FIG. 4 illustrates the convolution process. The X's 23 represent the pixels of the digital image 25 and the O's 27 represent the coefficients of of the kernel 29. The convolution operation generates an enhanced value for the pixel 31 under the center of the kernel 29.

Figure 5:
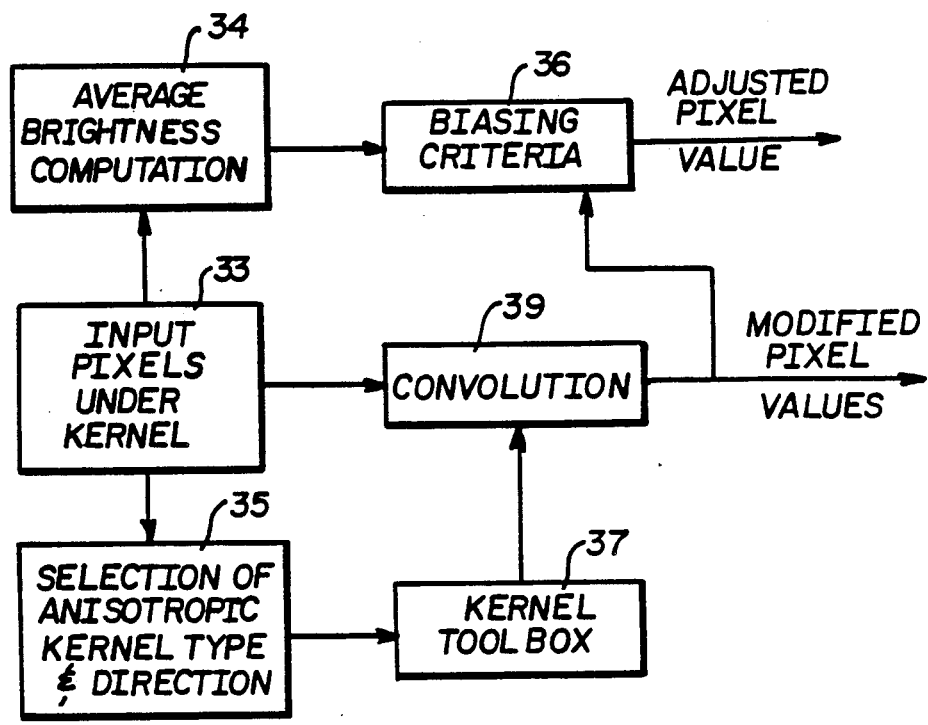
FIG. 5 is a diagram illustrating schematically the operation of FIG. 1 in carrying out adaptive anisotropic filtering in accordance with the invention.

An essential feature of the invention is the angular orientation of the kernel 29. FIG. 5 illustrates operation of the system of FIG. 1 for performing this function. The gray scale values of the pixels under the kernel are input as indicated at 33. Selection of the type of anisotropic kernel and of the direction of the kernel based on the gray scale values of the input pixels are determined as indicated at 35. The selected kernel matrix is then retrieved from the kernel toolbox and rotated to the selected direction at 37, and a convolution of the rotated kernel with the gray scale values of the pixels under the kernel is then performed at 39 to generate the modified gray scale value for the pixel 31 under the center of the kernel.

Figures 6, 7, 8:
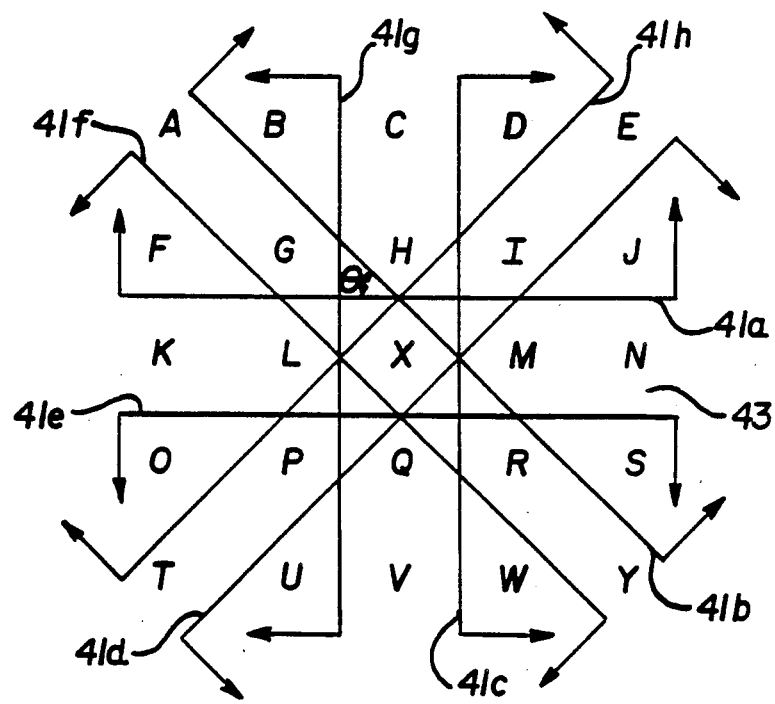
FIG. 6 illustrates the technique used to orient the anisotropic filters such as those shown in FIGS. 2 and 3 for application to the image pixel data as shown in FIG. 4.
FIG. 7 illustrates a gradient kernel which is used in the preferred embodiment of the invention to determine the direction for alignment of the anisotropic filters of FIGS. 2 and 3.
FIG. 8 illustrates rotation of the filter kernel of FIG. 3 in accordance with the invention.

The direction or angular orientation of the kernel is determined by performing a weighting calculation on the image in a number of directions around the center of the kernel. These weighting calculations are performed by grouping the pixels around the center pixel into sectors angularly displaced about the center pixel. In the example of FIG. 6, the pixels are divided into eight groups angularly separated by 45 degrees and defined by sector axes 41a through 41g. For the 5×5 kernel of the example (other size kernels could be used), each of the sectors 43 includes ten pixels. The average gradient between the pixels values in each sector and those in its opposite sector is then determined. One method for determining this gradient is to sum the gray scale values for the pixels in each sector. Since the number of pixels in each sector is the same, the sums are representative of the average value of the pixels in each sector. The sum of the pixel values for the opposite sector is then subtracted from the sum for each sector to generate the average gradient between each sector and its opposite sector.

In the preferred form of the invention, the average gradient between each sector and its opposite sector is determined by a convolution process utilizing the gradient kernel shown in FIG. 7. For determining the gradient for each sector and its opposite sector, the computer rotates the gradient kernel of FIG. 7 successively into alignment with the axis of each sector shown in FIG. 6 and then performs the convolution. Since, in the example, the gradient for opposite sectors will differ only in sign, only gradients for four non-opposite sectors need be calculated, and the others can be determined by changing the signs of the calculated values.

The gradients are then used to select a sector for orienting the filter kernel. The maximum or minimum gradient are preferred although some other criterion could be used for a particular application. In the exemplary system, the sector representing the maximum gradient is selected. The selected filter kernel is then oriented in the direction of the selected sector. Since the axis of the sector having the greatest gradient can be indicative of local line direction in the example of coronary angiograms, the anisotropic filters of FIGS. 2 and 3 can be oriented with the low pass filter function in the direction of the sector axis 41 of the selected sector in order to enhance line definition. The axis of the selected sector determines the direction for orientation of the kernel.

In rotating the anisotropic filter kernel into alignment with the selected sector axis, the computer rotates the coefficients in the matrix. Thus, if the selected sector is defined by the axis 41b in FIG. 6, which is at a 45 degree angle, the matrix shown in FIG. 3 is rotated to the orientation shown in FIG. 8. This rotated matrix would then be applied as shown in FIG. 4 to perform the convolution of the rotated filter coefficients with the gray scale values of the pixels in their unrotated positions.

Another aspect of the invention is local biasing of the gray scale pixel values to adjust local brightness with little effect on contrast. Broadly, this is accomplished as indicated in FIG. 5 by determining the average brightness under the entire kernel as indicated at 4. Based upon this average brightness calculation, selected bias criteria are applied as at 36 to the pixel values modified by the anisotropic filter function to generate adjusted pixel values. This average brightness under the kernel is determined by summing all pixels under the kernel and by dividing this sum by the total number of pixels counted. Where only the biasing aspect of the invention is to be used, without the anisotropic filtering, the average value of the pixels in a predetermined area around each pixel can be used to determine the average.

The average gray scale value of the pixels in the selected area around the selected pixel is compared with a reference value, which is selected to effect the desired adjustment in brightness. If it is desired to reduce the brightness of bright areas and increase the brightness of dark areas, a selected biasing function can be applied in the negative sense for those pixels in which the total sum or average pixel value exceeds the reference value and a positive sense to those pixels for which the total sum or the average value is less than the reference value. On the other hand, the selected bias function can be applied in a positive sense to those pixels having an average value under the kernel which exceeds the reference value and applied in a negative sense to those pixels having an average value under the kernel which is less than the reference value to accentuate the bright areas and subdue the dark areas. In the latter case, it is prudent to compare the biased gray scale value to limits to avoid saturation or total loss of the image feature.

Various bias functions can be utilized depending upon the desired effect. For instance, a selected value can be simply added to or subtracted from the gray scale value of the center pixel depending upon whether the average gray scale value is above or below the reference value. Alternatively, the bias function could effect a percentage change in the gray scale values, or other relationship could be used. While it is contemplated that biasing be applied in conjunction with anisotropic filtering, it will be appreciated by those skilled in the art that biasing in accordance with the invention could be utilized independent of anisotropic filtering. In that case, the gray scale values of pixels in a predetermined pattern, comparable to the pattern of a kernel, would be averaged for comparison with the reference value.

Figure 9:
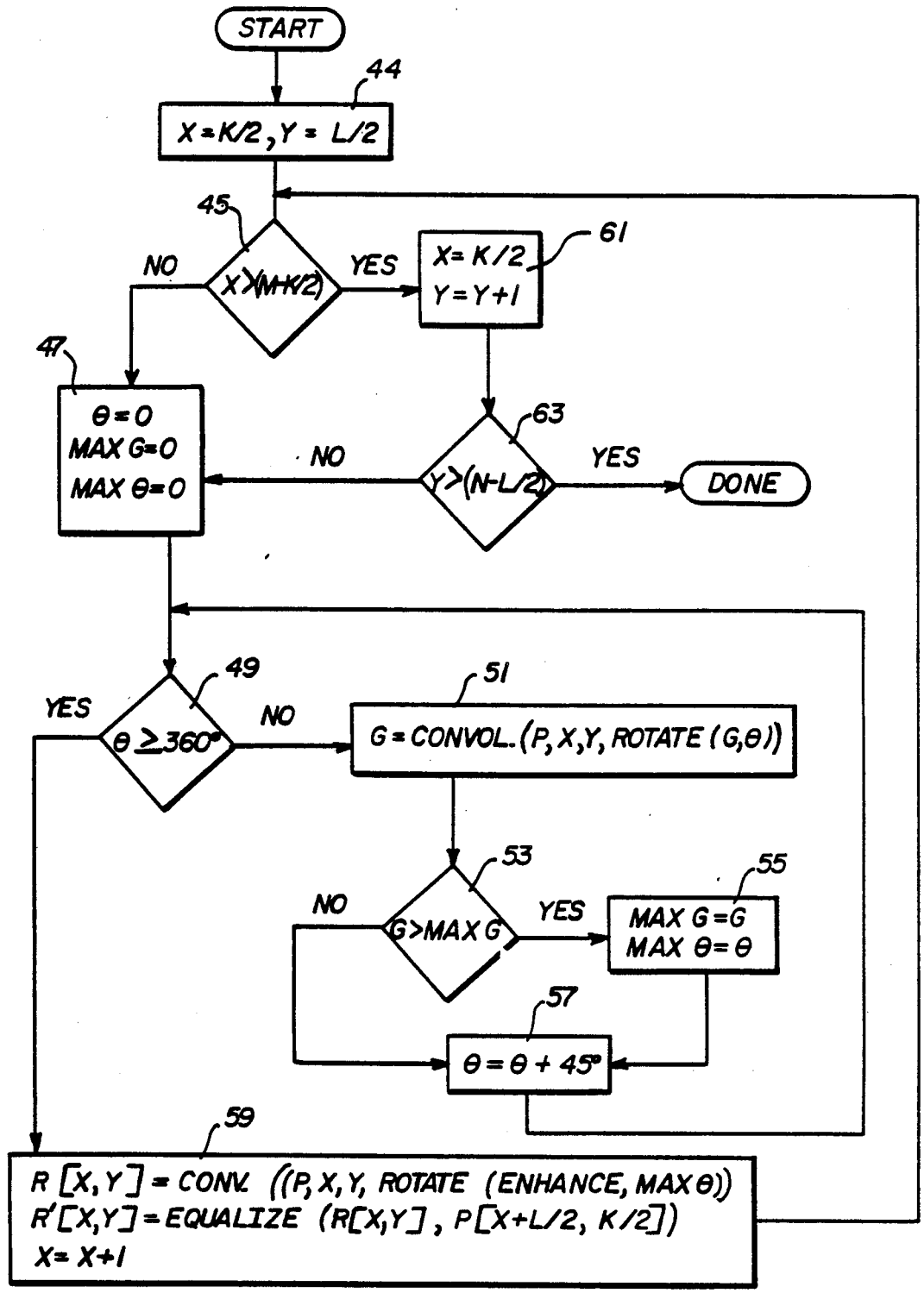
FIG. 9 is flow chart of a suitable computer program used by the system of FIG. 1 to implement adaptive anisotropic filtering and biasing in accordance with the invention.

FIG. 9 is a flow chart of a suitable program for the computer system of FIG. 1 to implement adaptive anisotropic filtering and biasing in accordance with the invention. In this program, the image is specified by a size M, N, and pixel value P. The variable X representing the X coordinate of a pixel is indexed between zero and M, while the Y coordinate is indexed between zero and N. The kernel size is specified by K in the X direction and L in the Y direction. Operation by the kernel on the image P, converts it to the modified image R. Biasing converts the modified image R to the image R'. G represents the gradient for a specified sector and its opposite sector and $\theta$ specifies the rotation angle and is indexed in 45 degree steps. MAX G is the maximum gradient of the gray scale values for all of the sectors and MAX $\theta$ identifies the sector in which the maximum gradient is found.

As shown at 44 in FIG. 9, X is initialized to K/2 and Y is set to L/2 so that the pixel values are available for all terms under the kernel. The program then enters a loop at 45 in which filtering and biasing are performed successively for each pixel in a row by indexing the X variable. For each pixel in the row, $\theta$, MAX G and MAX$\theta$ are initialized to zero at 47. Calculations are then made for each of the eight gradients around the selected pixel. This includes determining at 49 when all of the sector gradients have been calculated and for each sector determining the average gradient G between all of the pixels in the sector and its opposite sector as indicated at 51 by a convolution operation using the gradient kernel of FIG. 7. If this sum is larger than the saved maximum gradient as determined at 53 then MAX G is set to the new maximum sum and the $\theta$ at which the maximum gradient occurs, MAX $\theta$, is set equal to this $\theta$ at 55. Whether or not the calculated gradient is a new maximum, $\theta$ is indexed by 45 degrees at 57 and the calculation is repeated for each of the eight sectors as determined at 49. When the calculations for all eight sectors have been completed, MAX G will contain the maximum average gradient between a sector and its opposite sector and MAX $\theta$ will indicate the sector for which this maximum average gradient value occurred. The convolution operation with the anisotropic filter is then performed at 59 by rotating the matrix of coefficients of the kernel to the angle, MAX $\theta$, multiplying each of the coefficients by the corresponding gray scale value of the pixel under the kernel and summing the results. The resultant value R (X,Y) is the modified gray scale value of the selected pixel (X,Y). If biasing is to be applied, the average value of all of the pixels under the kernel is determined also at 59 and compared with a reference value to determine the sense in which the biasing function is to be applied to the modified value R (X,Y) to generate the adjusted gray scale value R' (X,Y). The variable X is then indexed by 1 and the process is repeated for the next pixel in the row. When the gray scale values of all the pixels in a row have been filtered and biased, as determined at 45, X is reinitialized to K/2 and Y is indexed by 1 as indicated at 61. Each of the gray scale values of the pixels in the next row are then filtered and biased, and the process is completed at 63 when the gray scale values of all the pixels, except those around the edge of the image, have been processed.

The present invention provides the capability of adapting an anisotropic filter function to the conditions at virtually every pixel in an image depending upon local conditions surrounding that pixel. It also provides the capability of even selecting the filter function to be applied at each pixel. It further provides a capability of locally adjusting the brightness of an image without significantly affecting contrast.

In order to increase the speed of execution, parts of the algorithm could be implemented in dedicated hardware.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of adaptive anisotropic filtering of gray scale values for pixels of a digital image comprising the steps of:
   (a) providing a kernel comprising a matrix of coefficients of a selected anisotropic filter function covering a predetermined number of pixels;
   (b) selecting a pixel and centering said kernel on said selected pixel;
   (c) angularly orienting said matrix of coefficients of said kernel as a weighting function of pixel gray scale values for a plurality of sectors of pixels under said kernel angularly distributed around said selected pixel;
   (d) performing a convolution of said pixel gray scale values under said kernel with said angularly oriented matrix of coefficients of the selected anisotropic filter function to generate a modified gray scale value for said selected pixel; and
   (e) successively repeating steps (b) through (e) for substantially all pixels in at least a portion of said digital image.

2. The method of claim 1 wherein said step of angularly orienting a matrix of coefficients of said kernel comprises:
   grouping equal numbers of pixels under said kernel into said sectors of pixels which are spaced from the selected pixel by sector axes equiangularly spaced about and passing adjacent to said selected pixel;
   selecting a sector as a function of the gray scale values for the pixels in said sectors; and
   orienting said matrix of coefficients in said kernel to the sector axis of the selected sector.

3. The method of claim 2 wherein said step of selecting a sector comprises:
   determining the average gradient between the gray scale values of the pixels in each sector and in its opposite sector; and
   selecting the selected sector as a function of said average gradients.

4. The method of claim 3 wherein said step of selecting a sector as a function of the average gradients between the gray scale values of pixels in each sector and in the opposite sector comprises selecting the sector with the greatest average gradient.

5. The method of claim 3 wherein the step of selecting a sector as a function of the average gradients between the gray scale values of pixels in each sector and in the opposite sector comprises selecting the sector with the smallest gradient value.

6. The method of claim 3 wherein the step of determining the average gradient between the gray scale values of the pixels in each sector and its opposite sector comprises for each sector:
   determining the average gray scale value of the pixels in the sector and in its opposite sector, and
   subtracting the average gray scale value of the pixels in the opposite sector from the average gray scale value of pixels in the sector.

7. The method of claim 3 wherein the step of determining the average gradient between the gray scale values of the pixels in each sector and in its opposite sector comprises:
   selecting a gradient kernel, successively rotating the gradient kernel into alignment with the axis of each sector, and
   performing for each rotation a convolution between the kernel and the pixel gray scale values.

8. The method of claim 3 wherein said step of providing a kernel comprises providing a kernel having a matrix or coefficients constituting a low pass filter function in one direction and a high pass filter function in a direction orthogonal to said one direction, and wherein the step of angularly orienting said matrix of coefficients comprises aligning said one direction parallel to the selected sector axis.

9. The method of claim 3 wherein said step of providing a kernel comprises providing at least two kernels each comprising a matrix of coefficients of a different anisotropic filter function, and wherein said step of angularly orienting said matrix of coefficients includes first selecting one of said at least two provided kernels as a function of the sums of gray scale values in each sector.

10. The method claim 3 including biasing said pixel gray scale values to adjust brightness without substantially effecting contrast comprising:
   adding said sums of gray scale values for all of said sectors to generate a total gray scale value, comparing said total gray scale value to a selected reference value, and adjusting said modified gray scale value to a biased gray scale value for said selected pixel as a function of said comparison.

11. A method of claim 10 wherein said step of adjusting the modified gray scale value comprises reducing the modified gray scale value of the selected pixel by a selected bias function when said total gray scale value exceeds said reference value, and increasing the modified gray scale value of the selected pixel by said selected bias function when said total gray scale value is less than said reference value.

12. The method of claim 10 wherein said step of adjusting the modified gray scale value of said selected pixel comprises increasing the modified gray scale value of the selected pixel by a selected bias function when the total gray scale value is more than said reference value and reducing the modified gray scale value of the selected pixel by said selected bias function when the total gray scale value is less than said reference value.

13. The method of claim 12 including storing limits for said adjusted gray scale values, comparing the adjusted gray scale value for the selected pixel to said limits, selecting an alternate bias function when a biased gray scale value is outside said limits and readjusting the modified gray scale values of each selected pixel by said alternate bias function.

14. Apparatus for adaptive anisotropic filtering of gray scale values for pixels of a digital image comprising:

storage means storing a selected kernel comprising a matrix of coefficients of a selected anisotropic filter function covering a predetermined number of pixels;

means successively selecting substantially all pixels in at least a portion of said digital image;

orienting means centering said kernel on said selected pixel, and angularly orienting said matrix of coefficients of said kernel as a function of the distribution of pixel gray scale values of pixels under said kernel; and convolution means performing a convolution of said pixel gray scale values under said kernel with said angularly oriented matrix of coefficients of the selected anisotropic filter function to generate a modified gray scale value for said selected pixel.

15. The apparatus of claim 14 wherein said storage means stores at least two kernels each comprising a matrix of coefficients of a different anisotropic filter function, and wherein said orienting means includes means for first selecting one of said two stored kernels as a function of the distribution of pixel gray scale values of pixels under the selected kernel.

16. The apparatus of claim 14 wherein said orienting means include means grouping equal numbers of pixels under said kernel into sectors of pixels spaced from the selected pixel by sector axes equiangularly spaced about and passing adjacent to said selected pixel, means summing for each sector the gray scale values for all of the pixels in the sector, means selecting a sector as a function of said sums, and means aligning said matrix of coefficients of said kernel to the sector axis of the selected sector.

17. The apparatus of claim 16 including biasing means biasing said modified gray scale values of the selected pixels to adjust brightness without substantially effecting contrast comprising:

means storing a reference value, means adding the sums of pixel gray scale values for all of said pixels under the kernel to generate a total pixel value, means comparing said total pixel value to said stored reference value and means adjusting the modified gray scale value of the selected pixel to an adjusted gray scale value by a selected bias function in a sense determined by said comparison means.

18. The apparatus of claim 16 wherein said grouping means groups pixels under said kernel into eight equiangularly spaced sectors.

19. The apparatus of claim 16 wherein said storing means stores a matrix of coefficients constituting a low pass filter function in one direction and a high pass filter function in a direction orthogonal to said one direction, and wherein said aligning means aligns said matrix of coefficients with said one direction parallel to the selected sector axis.

20. The apparatus of claim 18 wherein said grouping means groups said pixels under said kernel into eight equally spaced sectors.

21. The apparatus of claim 20 including biasing means for the modified pixel gray scale values to adjust brightness without substantially effecting contrast comprising:

means storing a reference value, means adding the sums of pixel gray scale values for all of said pixels under the kernel to generate a total pixel value, means comparing said total pixel value to said stored reference value, and means adjusting the modified gray scale value of the selected pixel to an adjusted gray scale value by a selected bias function in a sense determined by said comparison means.

* * * * *